April 6, 1965    C. E. PLYMALE    3,177,272
METHOD OF COLORING PLASTIC EXTRUDATE
Filed May 29, 1962
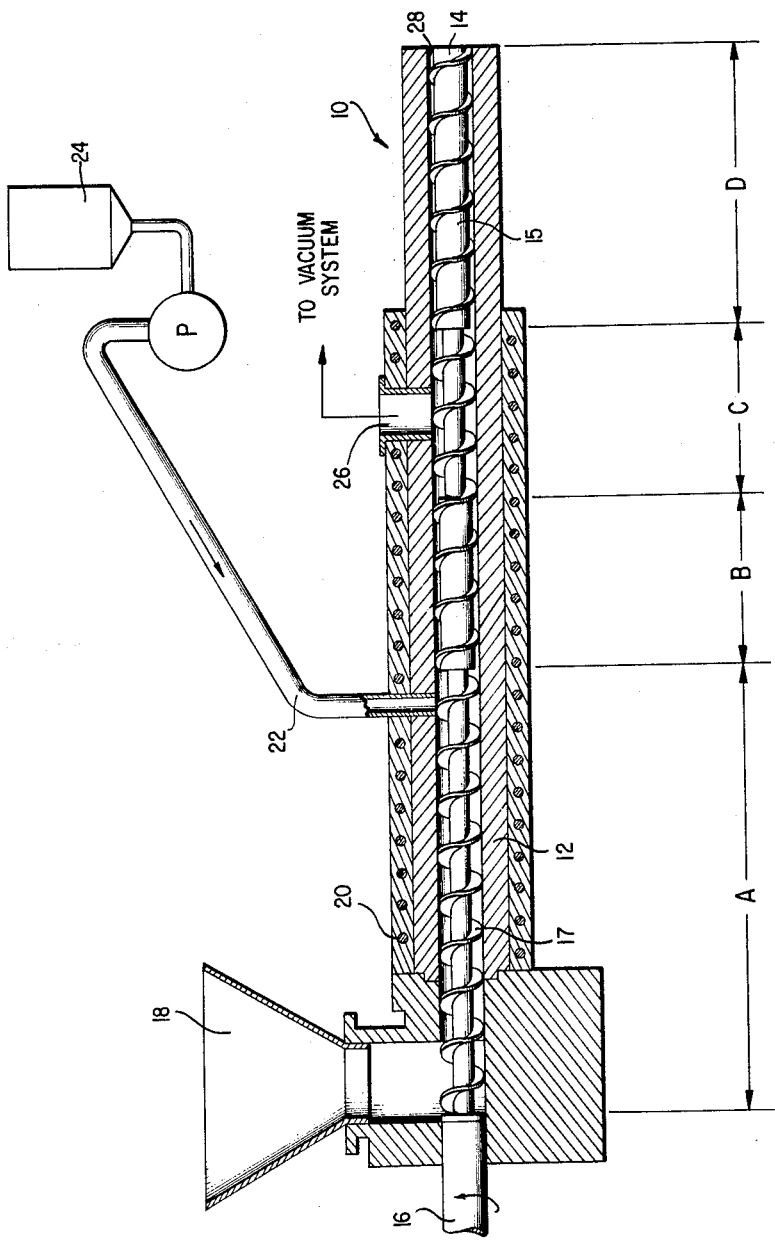
INVENTOR.
CHARLES E. PLYMALE
BY
Charles S. Lynch & W. A. Schaich
ATTORNEYS 3,177,272
METHOD OF COLORING PLASTIC EXTRUDATE
Charles E. Plymale, Maumee, Ohio, assignor to Owens-Illinois Glass Company, a corporation of Ohio
Filed May 29, 1962, Ser. No. 199,565
1 Claim. (Cl. 264—75)

This invention relates to a method for dispersing pigment or coloring within the plastic delivered by a plasticizing machine.

One method of dispersing pigments or colors in a plastic is to dry blend the pigment with the plastic and then feed the resulting mixture to a hopper of an extruder. This mixture is then forced through the extruder and out a die thereof by the rotation of the screw of the extruder. However, it has been observed that the plastic extrudate delivered by the extruder is not uniform in pigmentation or coloration due to a tendency of the pigment or color to agglomerate.

Accordingly, it is an object of this invention to provide a novel method for dispersing pigment or coloring within the plastic being delivered by a plasticizing machine so as to obtain an extrudate or product of uniform pigmentation or coloration.

A further object of this invention is to provide a novel method for dispersing pigment or coloring within the plastic being delivered by a plasticizing machine so as to obtain an extrudate or product of uniform pigmentation or coloration.

A further object of this invention is to provide a novel method for more rapidly dispersing pigment or coloring within the plastic being delivered by a plasticizing machine so as to obtain an extrudate or product of uniform pigmentation or coloration.

These and other objects will be apparent from the description which follows.

The novel process of this invention comprises dispersing or dissolving the pigment or color in a volatile liquid, thereafter metering the resulting dispersion or suspension to a medial portion of an extruder containing the plastic to be colored, then volatilizing the liquid in a forward portion of the extruder, and finally ejecting the plastic with the pigment uniformly distributed therethrough from a die located in the foremost portion of the extruder. By dispersing the pigment in this manner within the plastic being extruded, there is obtained a smaller particle size of pigment, thus preventing uneven pigment distribution in the finished plastic as extruded.

The novel features of the present method, including the objects and advantages thereof, will be better understood by reference to the following description taken in conjunction with the accompanying drawing.

In the drawing, the numeral 10 designates the novel extruding apparatus for carrying out the novel method of this invention. The extruder 10 consists essentially of a barrel 12 into which there is fitted a screw 14 that is rotatably driven in the indicated direction by a suitable power source (not shown) connected at 16. The plastic P is continuously fed into the plasticizing section A through feed hopper 18 by means of screw 14 having root 15 and threads 17. The plastic is thereafter successively advanced by the rotation of screw 14 through rear pump section B, venting section C and front pump section D. However, by the time the plastic has reached section B it is a viscous melted material since the barrel 12 is heated by an electric coil 20. Of course other heating means such as a steam coil and the like can be employed for this purpose.

At the forward end of the plasticizing section A a conduit 22 is provided for introducing a liquid suspension of pigment from a storage tank 24. As the pigment is advanced through section B a homogeneous mixing of the pigment and molten plastic occurs. In the venting section C there is provided an outlet 26 connected to a source of vacuum (not shown) which effects a removal of the volatile liquid holding the pigment in a dispersed or suspended condition. By the time the plastic reaches the front pump section D, the liquid holding the pigment in suspension has been removed by the vacuum system resulting in the fine particles of the pigment formerly held in suspension by the liquid to be uniformly distributed throughout the plastic. In section D a further mixing of the plastic occurs, and the plastic material is ultimately forced through section D and out die opening 28.

By utilizing the process and apparatus of this invention, there is obtained a plastic product which is characterized by having a uniform coloration. Moreover, with the novel method and apparatus of this invention, the use of dry blending equipment for mixing the plastic and pigment has not only been eliminated, but also the time consumed to perform the dry blending operation. With the present method and apparatus, the blending of plastic and pigment plus extrusion of the resulting mixture are carried on simultaneously with substantial savings in time and with little additional equipment and modification of existing extruding apparatus.

The present method and apparatus have particular application with respect to extruders having a large length to diameter (L:D) ratio, namely, greater than 15:1. By way of example, an extruder having an L:D ratio of 24:1 and 2½ inches diameter extrudes 150 pounds per hour of white high density polyethylene, when 3 pounds per hour of titanium oxide pigment in a water suspension is metered into the extruder. From the foregoing description, it will be apparent that there has been devised a novel method and apparatus for extruding plastic of uniform coloration and pigmentation.

Although the present description has been set forth in terms of polyethylene, it is evident that any thermoplastic resin, which may be non-foamed or foamed, can be uniformly colored by the method and apparatus of this invention. In addition, the front end of the extruder can be fitted with a die of a different configuration than that shown, depending upon whether the plastic to be extruded is to be used in the form of sheets, rods, tubes, and the like.

In the drawing it will be noted that the root 15 of screw 14 reaches its greatest diameter in sections B and D and is of lesser diameter in sections A and C. It will be apparent to those skilled in the art that the pitch of the screw threads and the root of the screw may be varied throughout its length, if desired, and such variations are contemplated by this invention. However, the general configuration of the screw as shown in the drawing has proven particularly effective in the method and apparatus herein disclosed.

The present method and apparatus are also applicable to the use of a wide variety of pigments and dispersing volatile liquids therefor. In fact any of the pigments used for coloring plastics can be so employed. Dispersing or suspending liquids for the pigments in addition to water include various organic liquids such as alcohol and acetone. In general the liquid employed should have a relatively low boiling point so as to facilitate its volatilization and removal from the extruder through the vacuum system attached thereto. In addition, liquids which would tend to react with the thermoplastic resin being extruded should be avoided.

The temperature at which the coil will be maintained so as to heat properly the plastic within barrel can also be varied depending upon the thermoplastic material being extruded. For example, with polyethylene temperatures ranging from 300 to 400° F. have been employed, while with cellulose acetate a temperature of about 295° F. will prove satisfactory. Moreover, in addition to heating coils a jacket through which a hot fluid is circulated can be substituted therefor as taught by U.S. Patent No. 2,177,658.

While I have described and illustrated preferred embodiments of my invention, I wish it to be understood that I do not intend to be restricted solely thereto, but that I do intend to cover all modifications thereof which would be apparent to one skilled in the art and which come within the spirit and scope of my invention.

What I claim is:

In a continuous method of forming a plastic extrudate of uniform color and steps comprising plasticizing plastic material by mixing and heating, introducing a uniform dispersion of a colorant in a liquid towards the end of said plasticizing step, further mixing and heating said plastic material, thereafter applying a vacuum while heating and mixing said plastic material to remove said liquid so as to prevent agglomeration of the pigment particles, further mixing and heating said colorant containing plastic material, and finally delivering said mixture of colorant and plastic material as an extrudate of uniform coloration.

References Cited in the file of this patent

UNITED STATES PATENTS

| | | |
|---|---|---|
| 1,156,096 | Price | Oct. 12, 1915 |
| 2,470,001 | Stober | May 10, 1949 |
| 2,719,325 | Franklin | Oct. 4, 1955 |
| 3,023,456 | Palfey | Mar. 6, 1962 |

FOREIGN PATENTS

| | | |
|---|---|---|
| 153,886 | Australia | Sept. 6, 1951 |